though they may be of any other form, if desired. These tooth-bars are secured to transverse bars B by means of devices which will permit the tooth-bars to be turned for the purpose of adjustment, and at the same time will serve to fasten them rigidly in any desired position. This is accomplished preferably by a staple which embraces the tooth-bars hung below the transverse bars, and the ends of which pass up through the latter, and are provided with nuts $c$ on the upper side of the bars B.

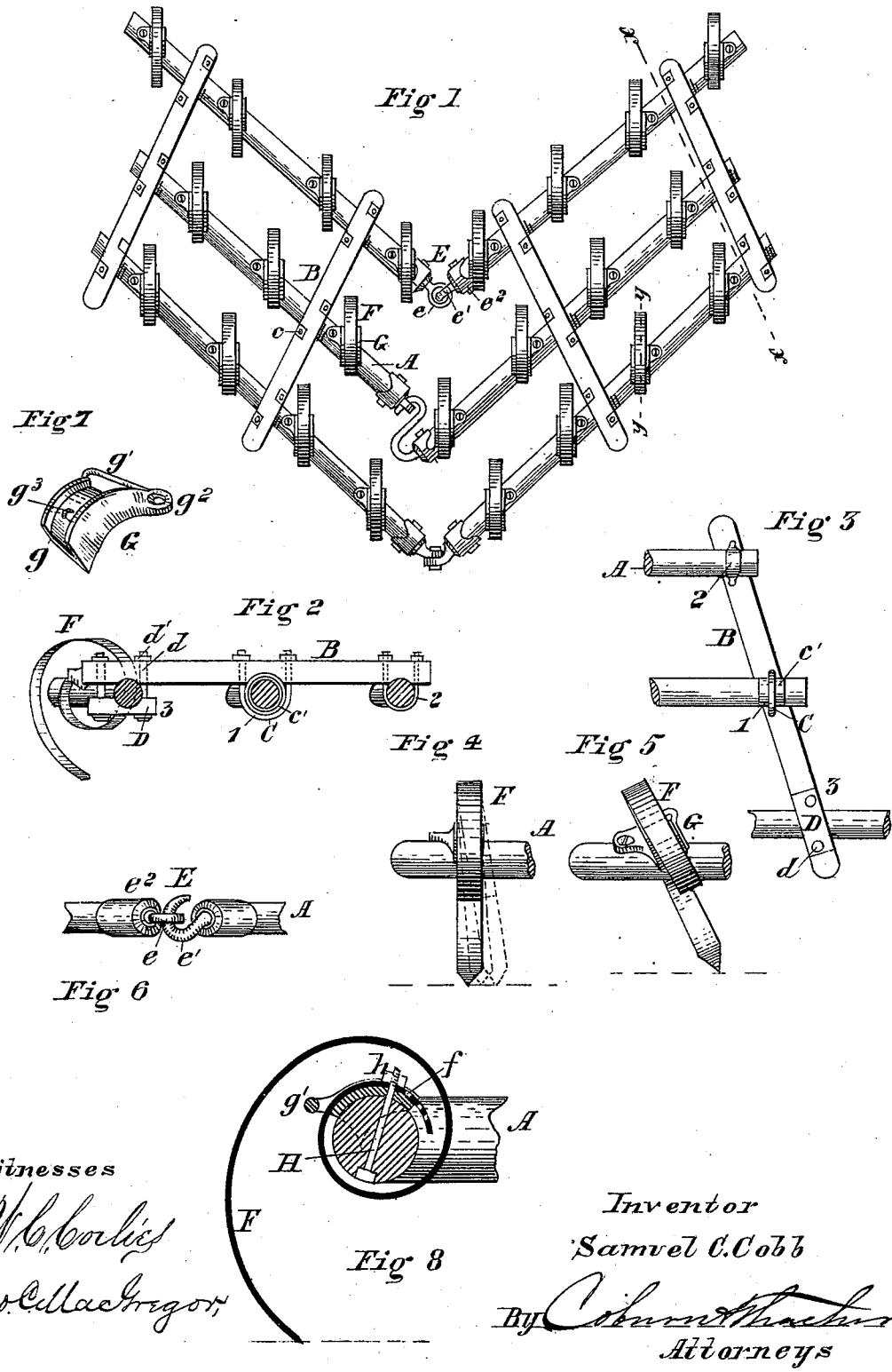

UNITED STATES PATENT OFFICE.

SAMUEL C. COBB, OF JANESVILLE, WISCONSIN, ASSIGNOR TO JAMES B. CROSBY, OF SAME PLACE.

SPRING-TOOTH HARROW.

SPECIFICATION forming part of Letters Patent No. 235,071, dated December 7, 1880.

Application filed December 20, 1879.

*To all whom it may concern:*

Be it known that I, SAMUEL C. COBB, of Janesville, in the county of Rock and State of Wisconsin, have invented a new and useful Improvement in Spring-Tooth Harrows, which is fully described in the following specification, reference being had to the accompanying drawings, in which—

Figure 1 represents a plan view of a harrow embodying my present improvements; Fig. 2, a transverse section taken on the line $x\ x$, Fig. 1; Fig. 3, a detail bottom plan of one of the end bars, showing the attachment of the tooth-bars thereto; Fig. 4, a detail elevation of a single tooth and section of the bar to which it is attached, the position of the tooth when adjusted on its bracket being shown in dotted lines; Fig. 5, a similar view, the tooth-bar having been turned forward; Fig. 6, a detail view of the connecting device at the inner end of the tooth-bars; Fig. 7, a perspective view of the tooth-bracket on an enlarged scale, and Fig. 8 a transverse section, on an enlarged scale, of a single tooth and its attachment, taken on the line $y\ y$, Fig. 1.

My invention relates to harrows in which coiled spring-teeth are used, and is an improvement on inventions in this class of harrows for which I have heretofore filed applications for Letters Patent.

The invention consists, first, in using inclined adjustable tooth-bars in connection with longitudinally-adjustable teeth; further, in placing a series of spring-teeth upon an inclined tooth-bar working in bearings, by the adjustment of which bar the teeth are inclined; further, in the peculiar device for attaching the teeth to the tooth-bar.

It also consists in special combinations of particular devices, as hereinafter specified. The special construction, arrangement, and operation of the different parts making a complete harrow in which my invention is carried out in one way will be hereinafter fully described, and the special improvements pointed out more definitely in the claims.

In the drawings, A represents the tooth-bars, which are here represented as cylindrical, A metallic bush or shoe, $c'$, is fitted to the tooth-bars, and is arranged between it and the staple on the under side of the tooth-bar, being grooved slightly to provide a seat for the staple. The under side of the bars B may be recessed slightly to provide a seat for the tooth-bars, if desired, and the bushing may be extended entirely around the bar by placing a section above the latter similar to that below, if desired. By turning up the nuts on the ends of the fastening-staple the tooth-bars will be clamped so tightly to the bars B that they cannot be turned, but will be held firmly in any desired position. If, however, it is desired to turn the tooth-bars for the purpose of adjusting the teeth, it is readily accomplished by simply loosening the nuts, thereby releasing the clamp.

The fastening device above described is shown at 1, Figs. 2 and 3 of the drawings. Instead of this construction the staple may be flattened at its bend, so as to make a broad band for the bearing of the tooth-bar, as shown at 2 in the same figures of the drawings, in which case the bushing may be dispensed with, as the wear upon the bar will be less.

Another modification is shown at 3 in the same figures, in which there is a straight block, D, similar to the bar B above, recessed slightly to provide a seat for the tooth-bar, and fastened to the latter by two bolts, $d$, on each side of the tooth-bar, and secured by nuts $d'$, by means of which the tooth-bar is clamped between the block and bar B.

The harrow is composed of two sets of toothed bars arranged at an angle to each other in a well-known way, as shown in Fig. 1 of the drawings, and hinged together at their inner ends. As it is desired, however, to have the toothed bars adjustable in their bearings, an ordinary hinge-connection between the two sets of bars will not answer. I therefore make this connecting device E a swiveling hinge, one part, $e$, being an eye, and the other, $e'$, being a hook, and each being attached to the end of the tooth-bars by means of a cap-piece, $e^2$, in which it is free to turn, thereby making a swiveling hinge-joint, which permits not only the sections of the harrow to vibrate in relation to each other, but also the tooth-bars to be turned independently in their bearings for the purpose of adjusting the teeth. The hooks may be bent in such form as to accommodate different positions of the bars, or the connection may be made by constructing the swiveling pieces with flat ends slightly bent and pivoting them together, as shown in coupling of the front bars in Fig. 1 of the drawings.

In ordinary use it is, of course, desirable that the harrow-tooth should stand straight in the direction of the line of draft. Evidently this would not be the case if the teeth were attached to their bars at right angles thereto in the usual way. I therefore arrange the teeth F at an angle to the tooth-bars A, as shown in Fig. 1 of the drawings, the angle of inclination being such as to bring the teeth directly in the line of draft under the ordinary adjustment of the bars. To effect this arrangement the upper ends of the teeth are bent or coiled in the usual way, and thereby adapted to fit a metal bracket, G, which is constructed with a convex seat, $g$, for the reception of the bent end of the tooth. The under side of this bracket is concave, adapting it to fit the tooth-bars, the bend of the curve being twisted or arranged spirally to adapt the bracket to fit the bar in an inclined position—that is, arranged at an angle to the length of the bar instead of straight across. The bracket is of about the same thickness its entire length, and has low flanges on each side of circular seat connected at the rear end of the bracket by a bar, $g'$, under which the tooth passes and is held between the flanges, the bar being effective as a stop to resist the strain upon the bent end of the tooth and prevent breaking. At one side of the rear end of the bracket is a small projecting flange or lug, $g^2$, perforated to permit the entrance of a screw or bolt, which constitutes one of the means for attaching the bracket to the bar.

A hole, $g^3$, is also made through the body or seat portion of the bracket, through which and the tooth-bar a fastening-bolt, H, is passed, provided with a nut, $h$, on one end, which furnishes the other means of securing the bracket to the bar. This same bolt H also serves to fasten the tooth to the bracket by passing through one of a series of holes, $f$, in the upper end thereof in that part which is fitted to the bracket-seat.

This construction and arrangement of the fastening saves the necessity of separate bolts for fastening the tooth to the brackets, as in the brackets shown in my prior application.

Any one of the teeth may be adjusted independently on its bracket by removing the fastening-bolt and turning the tooth around on its seat. This adjustment of the tooth will raise and lower the point thereof, and at the same time evidently change its position with reference to the line of draft, setting it at an angle thereto whenever adjusted from its normal position. This effect is produced by the twist of the tooth-seat, heretofore described, and is illustrated in Fig. 4 of the drawings, in which the tooth is shown in full lines in its normal position directly in the line of draft, and in dotted lines in a position to which it may be adjusted by turning forward on its seat. In this latter position the teeth will evidently enter the ground at an angle more or less acute, according to adjustment, so that the earth will have a tendency to slip by on one side something the same as in a plow, and thereby scour the tooth, if desired. If at any time one or more of the teeth become rusted or dirty they may be readily cleaned and scoured by a slight adjustment, as above described. When the tooth is thus adjusted it will also stir a greater width of the surface of the ground, cutting it up more than when the tooth is straight, a result which may be desired in some instances.

If it is desired to adjust all the teeth at once on any one bar or on all of the bars, it may be effected easily by adjusting the bars themselves by turning them in their bearings, as described above. An illustration of such adjustment is shown in Fig. 5 of the drawings, which represents the bar turned forward from its usual position, carrying the tooth with it and throwing it into a position inclined to the line of the draft the same as though adjusted independently on its seat. Of course all of the teeth attached to this bar will have the same position, the effect being substantially the same as that already described in the adjustment of the teeth singly.

Now, it is evident that changes may be made in the details of construction without changing the principle of operation. The tooth-bars may be changed in form and secured to the transverse bars by other devices than those herein described. The hinged connections may be changed in form and construction, providing, only, the swiveling feature be retained.

The brackets may also be of different construction, and in fact may be dispensed with entirely, and the teeth attached directly to the bars, as in some prior patents, in which case, however, the bend in the teeth should be twisted to suit the angular position of the tooth with reference to the bar, thus securing the advantages of this inclined arrangement.

Other changes may obviously be made, and therefore in the main features of my invention I do not limit myself to the precise construction of devices herein shown and described.

Having thus described my invention, what I claim as new, and desire to secure by Letters Patent, is—

1. In a harrow, the inclined tooth-bars A, adjustable axially in bearings, as described, in combination with curved elastic teeth attached to said bars and arranged at an angle to the axis thereof, substantially as and for the purpose set forth.

2. The inclined tooth-bars, in combination with a series of elastic teeth arranged thereon at an angle to the axis of the bars and adjustable angularly on their seats, substantially as described.

3. In combination with the tooth-bars, set at an angle, the bracket G, set at an angle to the axis of said tooth-bar, the longitudinally-adjustable elastic teeth, and the stop $g'$, as described.

4. In a harrow, the combination, with adjustable tooth-bars, of a bracket secured to the upper side of said tooth-bar, having a concave face to receive a circular elastic tooth, said tooth having openings to permit of its adjustment by a bolt passing through such tooth and bracket and securing both to the tooth-bar, as described.

5. In combination with the inclined tooth-bars working in bearings in cross-bars, as described, and secured together in pairs, so as to be independently adjustable, the curved spring-teeth set at an angle to the axis of such tooth-bars, a bracket for holding such teeth, and means for longitudinally adjusting the teeth upon such bracket, all as set forth.

SAMUEL C. COBB.

Witnesses:
  J. B. ROWLY,
  OTTO E. WILD.